United States Patent [19]
Kondo et al.

[11] Patent Number: 5,748,235
[45] Date of Patent: May 5, 1998

[54] IMAGING APPARATUS INCLUDING MEANS FOR CONVERTING RED, GREEN, AND BLUE SIGNAL COMPONENTS OF STANDARD RESOLUTION TO RESPECTIVE HIGH RESOLUTION SIGNAL COMPONENTS

[75] Inventors: Tetsujiro Kondo; Kunjo Kawaguchi, both of Kanagawa, Japan

[73] Assignee: Sony Corporation, Tokyo, Japan

[21] Appl. No.: 632,476

[22] PCT Filed: Aug. 31, 1995

[86] PCT No.: PCT/JP95/01740

§ 371 Date: Apr. 26, 1996

§ 102(e) Date: Apr. 26, 1996

[87] PCT Pub. No.: WO96/07275

PCT Pub. Date: Mar. 7, 1996

[30] Foreign Application Priority Data

Aug. 31, 1994 [JP] Japan ................................ 6-206958

[51] Int. Cl.6 .................................................. H04N 7/01
[52] U.S. Cl. ............................ 348/222; 348/266; 348/273; 348/441
[58] Field of Search ............................ 348/222, 262, 348/266, 272, 273, 441, 448, 450; H04N 7/01

[56] References Cited

U.S. PATENT DOCUMENTS 4,661,850  4/1987  Strolle et al. ............................ 348/450
5,309,227  5/1994  Inoue ....................................... 348/441
5,379,072  1/1995  Kondo ..................................... 348/441
5,521,636  5/1996  Nakayama et al. ..................... 348/222
5,541,651  7/1996  Iura et al. ................................ 348/441
5,546,194  8/1996  Ross ........................................ 348/441

FOREIGN PATENT DOCUMENTS 635978   1/1995  European Pat. Off. .......... H04N 7/01
102580   5/1988  Japan .............................. H04N 7/01
257175   9/1992  Japan .............................. H04N 5/335
178277   6/1994  Japan .............................. H04N 7/01

Primary Examiner—Glenton B. Burgess
Attorney, Agent, or Firm—Jay H. Maioli

[57] ABSTRACT

An imaging apparatus including a CCD for receiving light emanated from an object through a color filter and converting it into a video signal; a color separator circuit for separating the video signal from the CCD into R, G, and B, signal components; three, R, G, and B signal converters for converting the R, G, and B signal components from the color separator circuit to a high resolution R signal component, a high resolution G signal component, and a high resolution B signal component respectively which are higher in the resolution than the original signal components; and a signal processor circuit for receiving and processing the high resolution R, G, and B signal components of their respective signal converters to yield a luminance signal as well as a chrominance signal.

4 Claims, 11 Drawing Sheets

| TARGET HD PIXELS | SD PIXELS | | | | | | | | |
|---|---|---|---|---|---|---|---|---|---|
| | x1 | x2 | x3 | x4 | x5 | x6 | x7 | x8 | x9 |
| A | a | b | c | d | e | f | g | h | i |
| B | a | d | c | b | i | h | g | f | e |
| C | a | h | g | f | e | d | c | b | i |
| D | a | f | g | h | i | b | c | d | e |

IMAGING APPARATUS INCLUDING MEANS FOR CONVERTING RED, GREEN, AND BLUE SIGNAL COMPONENTS OF STANDARD RESOLUTION TO RESPECTIVE HIGH RESOLUTION SIGNAL COMPONENTS

TECHNICAL FIELD

The present invention relates to an imaging apparatus using a charge coupled device (referred to as a CCD) and particularly, to an imaging apparatus for producing a video signal of high resolution with a CCD.

BACKGROUND ART

Imaging apparatuses with CCD are well known for viewing an object and in response, producing a video signal. Such known imaging apparatuses will now be described referring to FIGS. 1 and 2.

FIG. 1 is a block diagram showing an example of the imaging apparatus of single array type provided with one CCD for producing a video signal.

Light emanated from an object is introduced from an optical system 1 and transmitted through a color filter 2 to a CCD 3. The color filter 2 is a complementary color filter assembly comprising, for example, a yellow filter, a cyan filter, and a magenta filter. The object emanated light is then subjected to photoelectric process in the CCD 3 before transferred as a video signal to a video amplifier 4. The video signal is amplified by the video amplifier 4 to a predetermined level and sent to an A/D converter circuit 5 where it is converted to a digital signal of a given bit format. The digital video signal from the A/D converter circuit 5 is further transmitted to a color separator circuit 6.

The color separator circuit 6 divides the digital video signal into three, R, G, and B, signal components which are then fed to a signal processor circuit 7. The signal processor circuit 7 performs common signal processing and matrix operations over the R, G, and B signal components to yield a luminance signal Y and two color-difference signals R-Y and B-Y. The R-Y and B-Y signals of the signal processor circuit 7 are then transferred to a modulator circuit 8.

The modulator circuit 8 operates orthogonal two-axis (two-phase) modulation of a chrominance subcarrier with the R-Y and B-Y signals to produce a carrier chrominance signal (referred to as a chroma signal) which is then supplied to one of two inputs of an adder 9. The other input of the adder 9 receives the Y signal from the signal processor circuit 7. The chroma signal from the modulator circuit 8 and the Y signal from the processor circuit 7 are combined to a digital composite video signal which is released from an output terminal 10.

The conventional imaging apparatus shown in FIG. 1 is equipped with the single CCD for converting the object emanated light into the R, G, and B signal components, thus minimizing its overall size and weight and being portable. However, the R, G, and B signal components are derived from a limited number of photoelectric elements or pixels where each color component is assigned to a small group of the pixels and their resultant signal or the digital composite signal at the output terminal 10 will relatively be low in the resolution.

For increasing the resolution, three-array type has been proposed including three CCDs. The three-array type of a conventional imaging apparatus will be explained referring to FIG. 2.

As shown in FIG. 2, light emanated from an object is introduced through an optical system 21 to a color separator prism 22. The color separator prism 22 divides the object emanated light into three, red, green, and blue, colors which are then transferred to a red CCD 23, a green CCD 24, and a blue CCD 25 respectively.

The red, green, and blue CCDs 23, 24, 25 convert their respective red, green, and blue light inputs by photoelectric processing to thee, R, G, and B signal components respectively. The R, G, and B signal components are transmitted to three video amplifiers 26, 27, and 28 respectively where they are amplified to predetermined levels before sent to three A/D converter circuits 29, 30, and 31 respectively. In their respective A/D converter circuits 29, 30, and 31, the R, G, and B signal components are converted to digital signals which all are transferred to a signal processor circuit 32.

The signal processor circuit 32 performs common signal processing and matrix operations over the R, G, and B signal components to yield a luminance signal Y and two color-difference signals R-Y and B-Y. The R-Y and B-Y signals of the signal processor circuit 32 are then transmitted to a modulator circuit 34.

The modulator circuit 34 operates orthogonal two-axis modulation of a chrominance subcarrier with the R-Y and B-Y signals to produce a chroma signal which is then supplied to one of two inputs of an adder 35. The other input of the adder 35 receives the Y signal from the signal processor circuit 32. The chroma signal from the modulator circuit 34 and the Y signal from the processor circuit 32 are summed to a digital composite video signal which is released from an output terminal 36.

Also, the Y, R-Y, and B-Y signals from the signal processor circuit 32 are directly transferred to three output terminals 37, 37, and 39 respectively for further delivery as component signals.

The imaging apparatus shown in FIG. 2 has the three CCDs provided for yielding the R, G, and B signal components respectively and a resultant composite video signal will thus be higher in the resolution than that of the single-array type shown in FIG. 1.

While high-resolution television systems have been developed of which resolution is much higher than that of the existing NTSC system, their video signals should be created with essentially a greater number of pixels than those of the tree-array type conventional CCD imaging apparatus. It is understood that the CCD with a greater number of pixels requires higher manufacturing skills and thus increases its price. This will soar the overall cost of manufacturing the imaging apparatus.

It is an object of the present invention, in view of the above predicaments, to provide an imaging apparatus capable of producing a video signal of higher resolution without particularly increasing the number of pixels.

DISCLOSURE OF THE INVENTION

One mode of the present invention is embodied by an imaging apparatus which comprises: an imaging means for receiving light emanated from an object through a color filter and converting it into a video signal; a separating means for separating the video signal from the imaging means into three, R, G, and B, signal components; three, first, second and third, converting means for converting the R, G, and B signal components from the separating means to a high resolution R signal component, a high resolution G signal component, and a high resolution B signal component respectively which are higher in the resolution than the original signal components; and a signal processing means for receiving and processing the high resolution R, G, and B signal components of their respective first, second, and third converting means to yield a luminance signal as well as a chrominance signal.

Each of the first, second, and third converting means may comprise: a block formalizing means for grouping the signal component into blocks; a compressing means for compressing data of each block determined by the block formalizing means; a class detecting means for specifying a class of the block by examining a pattern of levels of the compressed data and producing a signal indicative of the class; a predictive parameter memory for holding predictive parameters for use in converting the signal component to the high resolution signal component, and selecting the predictive parameters in response to the class indication signal from the class detecting means; and a predictive operating means for subjecting the signal component to predictive operation with the predictive parameters from the predictive parameter memory thus to produce the high resolution signal component.

Another mode of the present invention is embodied by an imaging apparatus which comprises: three, first, second, and third, imaging means for receiving and converting red color light, green color light, and blue color light into R, G, and B signal components respectively; three, first, second and third, converting means for converting the R, G, and B signal components from the first, second, and third imaging means to a high resolution R signal component, a high resolution G signal component, and a high resolution B signal component respectively which are higher in the resolution than the original signal components; and a signal processing means for receiving and processing the high resolution R, G, and B signal components of their respective first, second, and third converting means to yield a luminance signal as well as a chrominance signal.

A further mode of the present invention is embodied by an imaging apparatus which comprises: an imaging means for receiving and converting light emanated from an object into a video signal; a signal processing means for processing the video signal from the imaging means to produce a luminance signal and two, first and second, color-difference signals; and three, first, second and third, converting means for converting the luminance signals and the first and second color-difference signals from the signal processing means to a high resolution luminance signal and two, first and second, high resolution color-difference signals which are higher in the resolution than the original luminance and color-difference signals.

A still further mode of the present invention is embodied by an imaging apparatus which comprises: an imaging means for receiving and converting light emanated from an object into a video signal; a signal processing means for processing the video signal from the imaging means to produce a luminance signal and a chrominance signal; a combining means for producing a composite video signal from the luminance and chrominance signals of the signal processing means; and a converting means for converting the composite video signal from the combining means to a high resolution composite video signal which is higher in the resolution than the original composite video signal.

BEST MODE FOR CARRYING OUT THE INVENTION

Preferred embodiments of the present invention will be described referring to the accompanying drawings.

Figure 3:
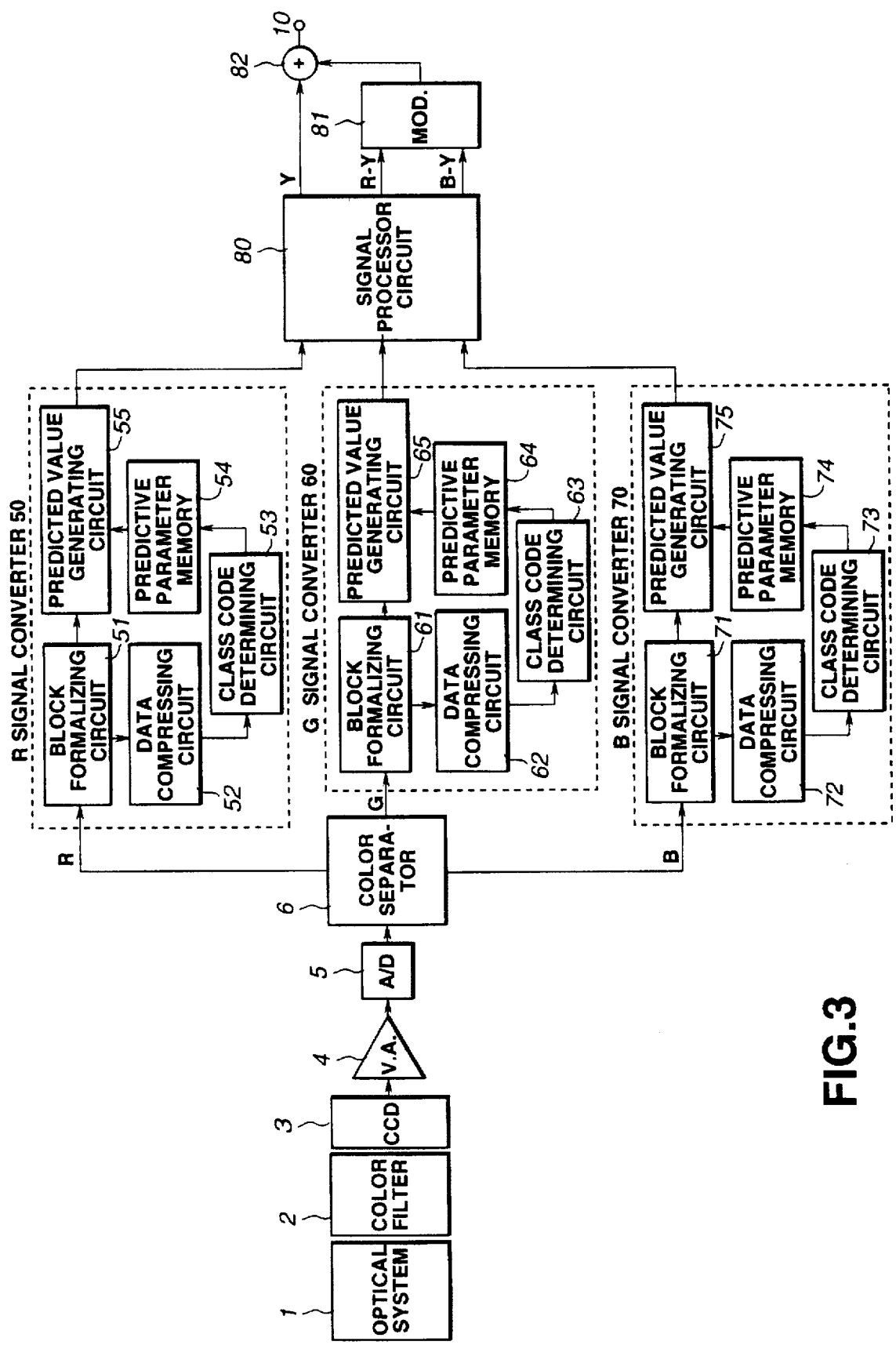
FIG. 3 is a block diagram of a first embodiment of an imaging apparatus according to the present invention.

FIG. 3 illustrates a first embodiment of the present invention. As shown, an imaging apparatus is provided with a single CCD (charge coupled device) composed of solid-state photoelectric elements or pixels for generating three, red (R), green (G), and blue (B), signal components corresponding to the primary colors of light, converting them into high resolution signals, and summing the high resolution signals to a composite video signal of the high resolution. It is now assumed that the signal component before converted to a high resolution signal is termed as an SD (standard definition) signal and the high resolution signal is called as a HD (high definition) signal.

Figure 1:
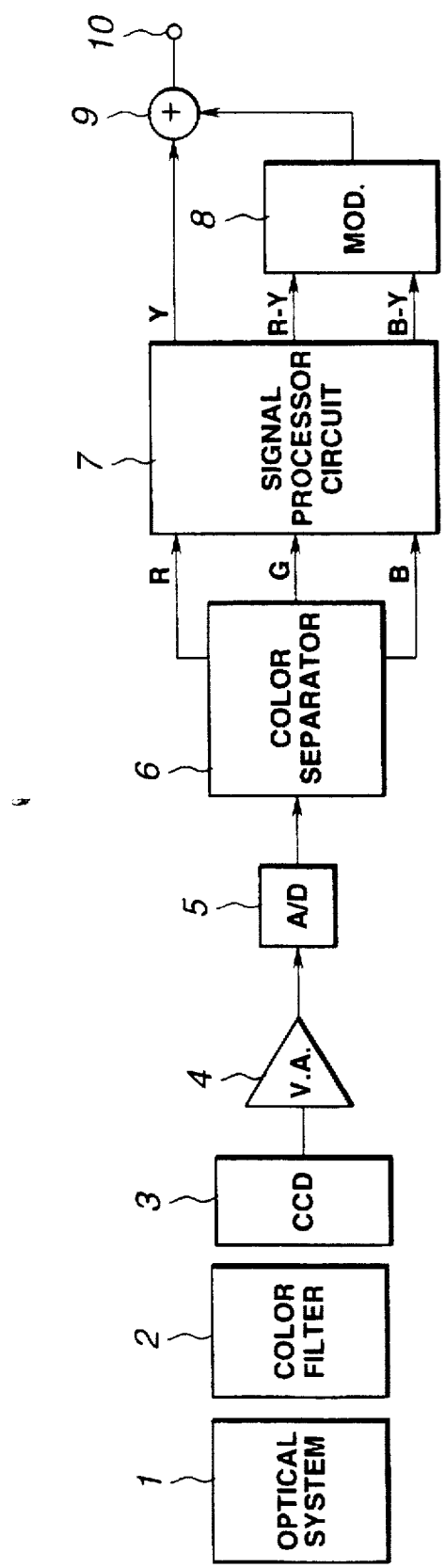
FIG. 1 is a block diagram showing a conventional imaging apparatus.

Like components shown in FIG. 3 are denoted by like numerals as those in FIG. 1 for ease of the description.

Light emanated from an object is introduced from an optical system 1 and transmitted through a color filter 2 to a CCD 3. The color filter 2 is a complementary color filter assembly comprising, for example, a yellow filter, a cyan filter, and a magenta filter. The object emanated light is then subjected to photoelectric process in the CCD 3 before transferred as a video signal to a video amplifier 4. The video signal is amplified by the video amplifier 4 to a predetermined level and sent to an A/D converter circuit 5 where it is converted to a digital signal of a given bit format. The digital video signal from the A/D converter circuit 5 is further transmitted to a color separator circuit 6.

The color separator circuit 6 divides the digital video signal into three, R, G, and B, signal components which are then fed to an R signal converter 50, a G signal converter 60, and a B signal converter 70 respectively.

As shown in FIG. 3, the R signal converter 50 comprises a block formatting circuit 51 for grouping the R signal component from the color separator circuit 6 into blocks, a data compressing circuit 53 for compressing each block of the R signal component from the block formalizing circuit 51, a class code determining circuit 53 for identifying a class to which the block of the R signal component compressed by the data compressing circuit 52 is attributed through examining a level pattern of the R signal component and determining a corresponding class code, a predictive parameter memory 54 for specifying predictive parameters in response to the class code from the class code producing circuit 53, and a predicted value generating circuit 55 for subjecting the block of the R signal component from the block formalizing circuit 51 to predictive operation with the predictive parameters supplied from the predictive parameter memory 54.

Similarly, the G signal converter 60 comprises a block formatting circuit 61 for grouping the G signal component from the color separator circuit 6 into blocks, a data compressing circuit 63 for compressing each block of the G signal component from the block formalizing circuit 61, a class code determining circuit 63 for identifying a class to which the block of the G signal component compressed by the data compressing circuit 62 is attributed through examining a level pattern of the G signal component and determining a corresponding class code, a predictive parameter memory 64 for specifying predictive parameters in response to the class code from the class code producing circuit 63, and a predicted value generating circuit 65 for subjecting the block of the G signal component from the block formalizing circuit 61 to predictive operation with the predictive parameters supplied from the predictive parameter memory 64, as shown in FIG. 3.

Furthermore, the B signal converter 70 comprises a block formatting circuit 71 for grouping the B signal component from the color separator circuit 6 into blocks, a data compressing circuit 73 for compressing each block of the B signal component from the block formalizing circuit 71, a class code determining circuit 73 for identifying a class to which the block of the B signal component compressed by the data compressing circuit 72 is attributed through examining a level pattern of the B signal component and determining a corresponding class code, a predictive parameter memory 74 for specifying predictive parameters in response to the class code from the class code producing circuit 73, and a predicted value generating circuit 75 for subjecting the block of the B signal component from the block formalizing circuit 71 to predictive operation with the predictive parameters supplied from the predictive parameter memory 74.

The resultant high resolution R, G, and B signal outputs from their respective signal converters 50, 60, and 70 are transferred to a signal processor circuit 80.

The signal processor circuit 80 performs common signal processing and matrix operations over the high resolution R, G, and B signal outputs to yield a high resolution luminance signal Y and two high resolution color-difference signals R-Y and B-Y. The construction and operating principles of the signal processor circuit 80 is well known and will be explained in no more details. It should be noted that the signal processor circuit 80 is tailored to operate at a higher rate than that of the signal processor circuit 7 of the conventional imaging apparatus shown in FIG. 1.

The high resolution R-Y and B-Y signals of the signal processor circuit 80 are then transmitted to a modulator circuit 81. The modulator circuit 81 operates orthogonal two-axis (two-phase) modulation of a chrominance subcarrier with the high resolution R-Y and B-Y signals to produce a high resolution chroma signal which is then supplied to one of two inputs of an adder 82. The other input of the adder 82 receives the high resolution Y signal from the signal processor circuit 80. The high resolution chroma signal from the modulator circuit 81 and the high resolution Y signal from the processor circuit 80 are combined to a digital composite video signal of high resolution which is released from an output terminal 10. Also, the modulator circuit 81 and adder 82 are tailored to operate at higher rates than those of the modulator circuit 8 and adder 9 of the conventional imaging apparatus shown in FIG. 1.

The action of the imaging apparatus of the first embodiment of the present invention shown in FIG. 3 will now be described.

The object emanated light is directed through the optical system 1 and the color filter 2 to the CCD 3 where it is photoelectric processed to a video signal. The video signal is amplified by the video amplifier 4 to a predetermined level and sent to the A/D converter circuit 5 where it is converted to a digital signal. The digital video signal is then divided by the color separator circuit 6 into three, R, G, and B, signal components which are fed to the R, G, and B signal converters 50, 60, and 70 respectively. After the R, G, and B, signal components are converted to their respective high resolution R, G, and B signal outputs, they are transferred to the signal processor circuit 80 which in turn produces the high resolution luminance Y signal and the two high resolution color-difference, R-Y and B-Y, signals.

The high resolution R-Y and B-Y signals are transmitted to the modulator circuit 81 where it is used for orthogonal two-axis modulation of a chrominance subcarrier to yield a high resolution chroma signal. The high resolution chroma signal from the modulator circuit 81 and the high resolution Y signal from the signal processor circuit 80 are summed by the adder 82 yielding to a digital composite video signal of high resolution at the output terminal 10.

Accordingly, with the common CCD composed of a traditional number of pixels, the digital composite video signal can be produced having a higher resolution than that of the conventional imaging apparatus.

The construction and operating principles of the R, G, and B signal converters 50, 60, and 70 will be described in more details.

The three, R, G, and B, signal converters 50, 60, and 70 are identical in the construction and operating principles and the description will be made referring to the R signal converter 50. It should be noted that the description is minimum for understanding of the imaging apparatus of the present invention since the construction and operating principles of a similar signal converter have been disclosed in WIPO International Publication WO 94/14278.

Referring to FIG. 3, the SD signal supplied to the block formalizing circuit 51 in the R signal converter 50 is a digital signal with a format of 8 bits per pixel or pixel sampled at a specific sampling frequency. The SD signal of raster scan sequential data is grouped by the block formalizing circuit 51 to one-, two-, or three-dimensional blocks.

The signal output from the block formalizing circuit 51 is transferred to both the data compressing circuit 52 and the predicted value generating circuit 55. The output of the data compressing circuit 52 is fed to the class code determining circuit 53 which in turn determines and sends a class code as an address signal to the predictive parameter memory 54. The predictive parameter memory 54 holds a table of predictive parameters determined through learning process. The predictive value generating circuit 55 receives predictive parameters selected at the predictive parameter memory 54.

In the data compressing circuit 52 and class code determining circuit 53, target pixels for the prediction are classified according to a pattern of levels of the block data including data from the target pixels. Hence, the class code determining circuit 53 delivers a resultant class code representing a class determined by the classification. The classification is conducted over the SD signal. If 8-bit neighbor pixels of the SD signal (referred to as SD pixels) about the target pixels are directly referenced, their classes will be increased in number. For compensation, the data compressing circuit 52 is provided for compressing bit data of the (reference) neighbor pixels. The data compressing circuit 52 may be an ADRC (adaptive dynamic range coding) encoder circuit.

The compression of data is not limited to the ADRC but other known methods may be used with equal success including DCT (discrete cosine transform), VQ (vector quantization), DPCM (differential pulse code modulation), BTC (block truncation coding), and non-linear quantization.

Figure 4:
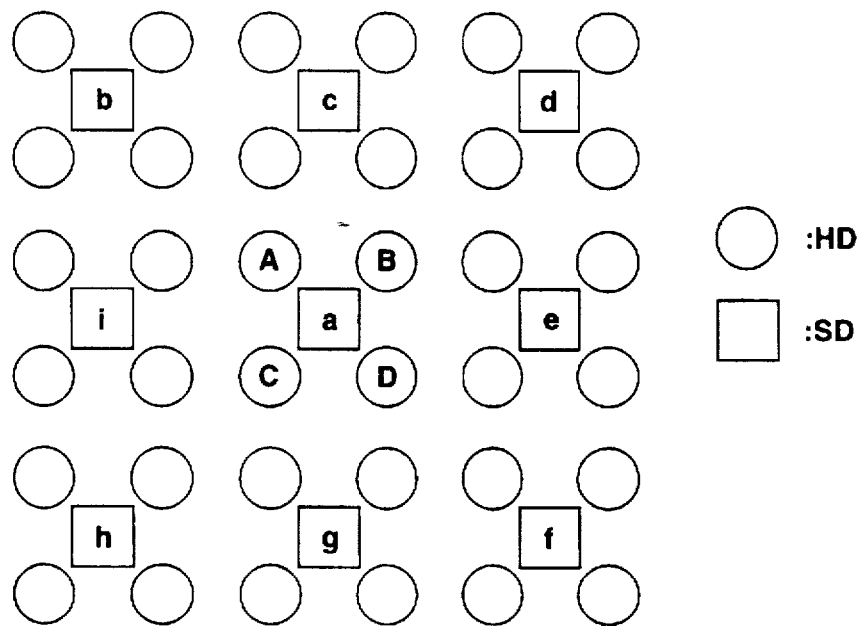
FIG. 4 is a schematic diagram showing a two-dimensional array of pixels for SD and HD signals.

The block formalizing circuit 51 shifts the SD signal from raster scan sequence format of the television signal to two-dimensional block format, as shown in FIG. 4. FIG. 4 illustrates one block comprising 3×3 pixels, 9 SD pixels denoted by a to i. Accordingly, four HD pixels, A to D, about an SD pixel located in the center of a block are specified by the predicted value generating circuit 55.

While the block shown in FIG. 4 is an example, a one-dimensional block comprising 4 SD pixels, a to d, may be used for generating the predicted value of HD pixel. Also, three-dimensional blocks will be utilized with equal success.

Figure 5:
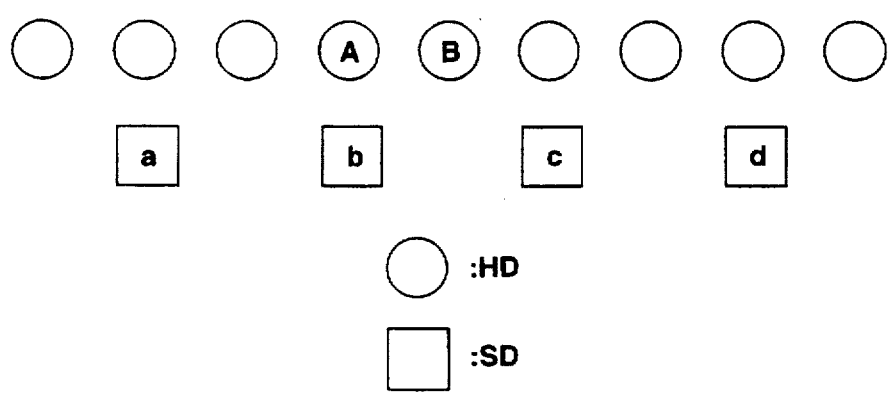
FIG. 5 is a schematic diagram showing a one-dimensional array of pixels for SD and HD signals.

As shown in FIG. 5, HD pixels of class A are determined by a, b, and c of the SD pixels and c of class B by a, b, c, and d thus generating corresponding predicted values. The class and predicted value can also be specified through the learning process.

The ADRC coding applicable to the data compressing circuit 52 will now be explained in details.

Figure 6:
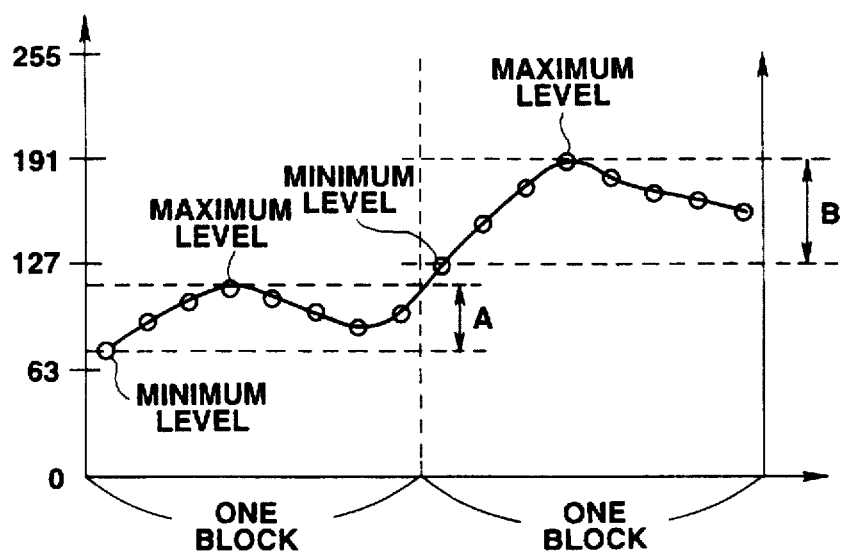
FIG. 6 is a graphic diagram of a change in the signal level explaining ADRC coding.

The ADRC coding allows adaptive reduction of a redundancy of the level range in consideration of local correlation of the pixels. For example, as shown in FIG. 6, a dynamic range A or B of levels in each block to be quantized is much smaller than the entire dynamic range, 0 to 255, of the 8-bit format. Therefore, the format for quantization can be reduced from 8 bits to a small number.

Assuming that a smaller number of bits than the original number or eight is p, the dynamic range of a block is DR, the level of a pixel in the block is x, and the requantized code is Q, the following equations (1) are established for the block of which amplitude is divided by 2p between the upper limit, MAX and the lower limit, MIN;

$$DR=MAX-MIN+1$$
$$Q=[(x-MIN+0.5)\times 2^P/DR] \qquad (1)$$

where [z] represents the largest integer below z.

Figure 7:
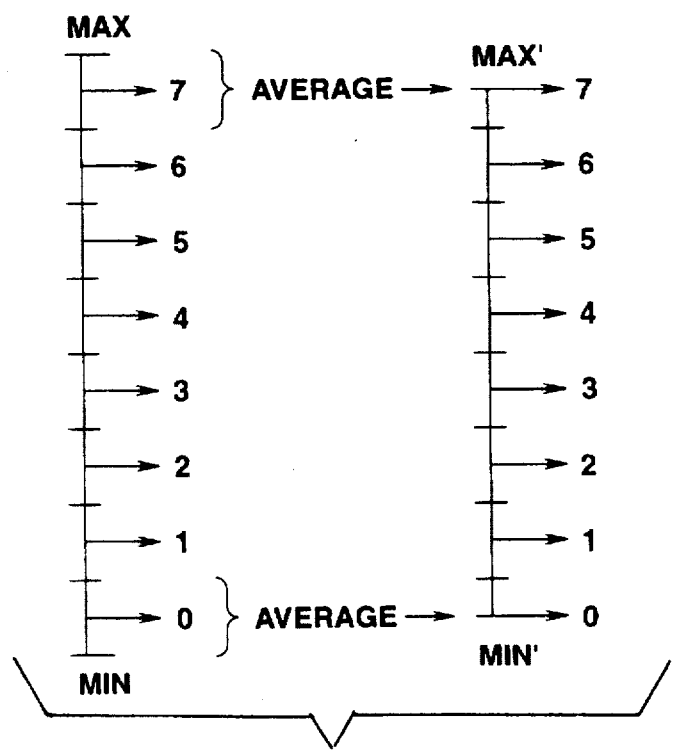
FIG. 7 is a graphic diagram explaining quantization in the ADRC coding.

Then, an average of pixel levels in the block of the p-bit format is calculated in the range of 2p-1 levels as shown in FIG. 7(a) and its value is designated as a new upper limit MAX', as shown in FIG. 7(b). When the smallest level of the pixels in the block is MIN' equivalent to 0 of the original level range, the dynamic range is shifted from between MAX and MIN to between MAX' to MIN'. Accordingly, the following equations (2) are now established;

$$DR'=MAX'-MIN'$$
$$q=[(x-MIN')\times(2^P-1)/DR'+0.5] \qquad (2)$$

where [z] represents the largest integer blow z.

Because the dynamic range DR is definitely tailored between MAX' and MIN', the data compression of ADRC coding can be increased in efficiency without intervention of noise.

The quantization of ADRC is also capable of having a reproduced level equal to MAX or MIN.

In case of the two-dimensional blocks, nine 8-bit pixel values are converted by the compressing action of ADRC to n p-bit pixel values which are transferred to the class code determining circuit 53. Thus, the class code, class, representing a class of the n values is expressed by:

$$\text{class} = \sum_{i=1}^{n} q_i(2^P)^i \qquad (3)$$

The action of a one-bit ADRC encoder circuit will be explained referring to FIG. 8.

Figures 8, 9:
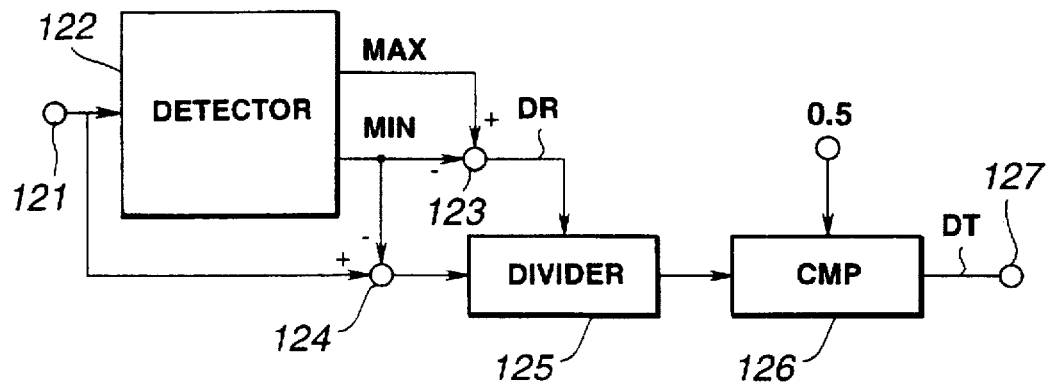
FIG. 8 is a block diagram showing a one-bit ADRC coding circuit.
FIG. 9 is a diagram showing a table of the SD signal pixels for predicting the HD signal pixels.

As shown in FIG. 8, the blocks of data are fed in sequence to an input terminal 121 and examined by a detector circuit 122 to specify MAX and MIN of pixels in each block. MAX and MIN levels are transferred to a subtracter circuit 123 where MIN is subtracted from MAX to have a dynamic range DR. Simultaneously, MIN level is fed to another subtracter circuit 124 where it is subtracted from the level of a pixel to have an initialized value.

The dynamic range DR and the initialized value are transferred to a divider circuit 125 where the initialized value is divided by the dynamic range to calculate a quotient which is sent to a comparator circuit 126. The comparator circuit 126 examines whether or not the quotient from each of the 9 pixels is greater than 0.5 of a reference value. As the result, one-bit data DT of either 0 or 1 is released from an output terminal 127 depending on the value of the quotient. Through the one-bit ADRC process, a class of the SD block of 3×3 pixels can be expressed by a 9-bit class code.

Returning to FIG. 3, predictive parameters corresponding to the class code are read from the predictive parameter memory 54 and transferred to the predicted value generating circuit 55 where a predicted value y' for HD pixel is calculated by linear combination of the SD values in blocks and the predictive parameters w1 to wn as is expressed by:

$$y'=w_1x_1+w_2x_2+\ldots+w_nx_n \qquad (4)$$

More particularly, FIG. 4 shows n=9 aid the HD pixel to be predicted can be determined by one of the SD values x1 to x9 in view of a table shown in FIG. 9.

For calculating the predicted value of each of the four HD pixels A to D in a block, the SD pixel to be associated with the predictive parameters is shifted depending on the location of the HD pixel. If the HD pixel is A, the predicted value is calculated from:

$$y'=w_2b+2_3c+\ldots+w_ni \qquad (5)$$

Also, if the HD pixel is B, the predicted value is calculated from:

$$y'=w_{a+w_2}d+w_3c+\ldots+w_n e \qquad (6)$$

As apparent, the same parameters can be used for calculating the predicted values of different HD pixels in one block (i.e. in the same class). Hence, the predictive parameter memory 54 can be reduced in the storage size and access action thereto will be minimized in number. It should be noted that the relation between the SD values x1 to x9 multiplied by the parameters and the SD pixels a to i shown in the table of FIG. 9 is defined by the distance from the target HD pixels to the SD pixels.

The values x1 to x9 may possibly be allocated to nine bits of the class code defined by the one-bit ADRC process. In other words, the class assigned to each of the HD pixels A to D about the center of a block may be identified by changing the sequence of bits of the compressed data of the SD pixels a to i. It is thus possible that the bits have been stored in a memory and when requested are read in a desired sequence for defining the class.

Figure 10:
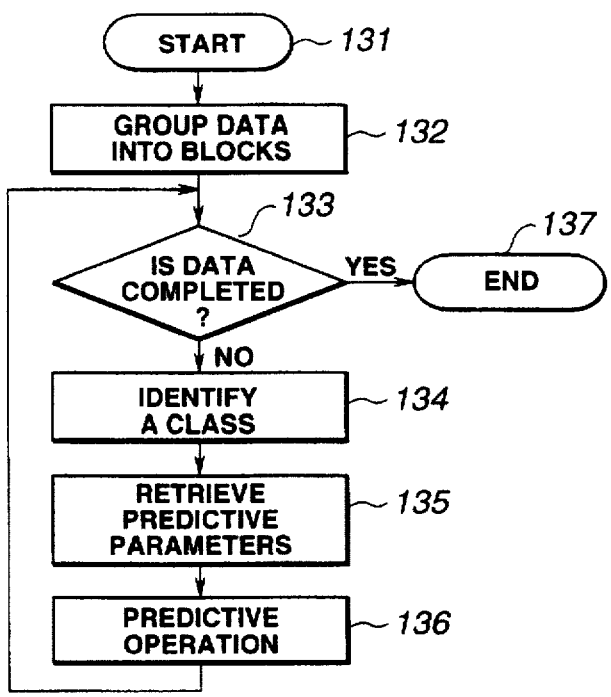
FIG. 10 is a flow chart explaining the action of a signal converter.

FIG. 10 is a flow chart showing the procedure of up converting from the SD signal to the HD signal.

The up conversion procedure starts with Step 131 and the SD signal is grouped to blocks at Step 132, allowing SD pixels in each block to be processed as shown in FIG. 4. It is then examined at Step 133 whether or not the data of all pixels has been processed. If yes, the procedure goes to Step 137 and is terminated. When the data is not processed, the procedure advances to Step 134 for determining the class.

At Step 134, the class is identified by examining a pattern of levels of the SD signal. For example, the compressed data from the one-bit ADRC process is used to identify the class. Then, the predictive parameters corresponding to the class codes are read from their memory at Step 135. This is followed by Step 136 where the predicted value y' for HD pixel is calculated using the (4) equations. This sequence of steps is repeated for all the data and after the data are all completed, the procedure moves through Step 133 to Step 137 to terminate its up conversion routine.

Figure 11:
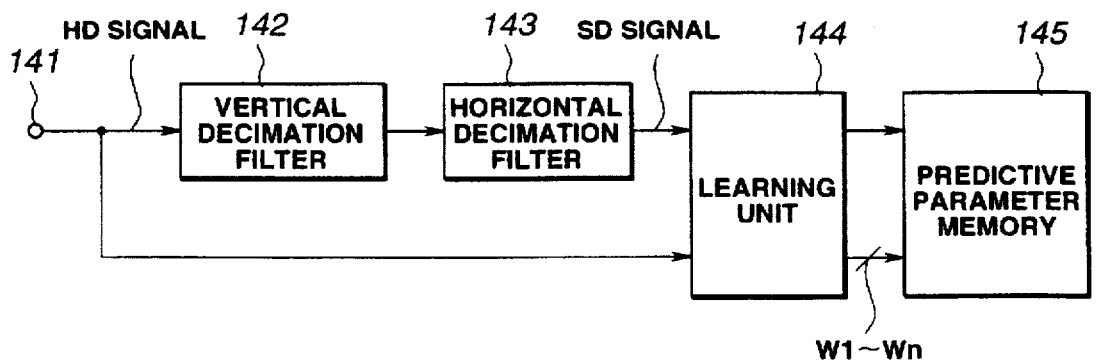
FIG. 11 is a block diagram showing schematically an assembly for determining predictive parameters through learning process.

The predictive parameter memory 54 holds a given number of the predictive parameters defined by the learning process. The learning process will now be explained. FIG. 11 is a block diagram showing an assembly for learning the predictive parameters.

A large number of typical HD signals of still image are loaded to an input terminal 141 and transmitted directly to both a vertical decimation filter 142 and a learning unit 144. The vertical decimation filter 142 carries out vertical decimation of the HD signal. A vertically decimated HD signal is then fed to a horizontal decimation filter 143 connected to the output of the vertical decimation filter 142 where it is horizontally decimated to ½. Accordingly, the decimated HD signal is a video signal indicative of less pixels which are equal in number to those of an SD signal as is transferred to the learning unit 144. The video signal is then grouped to classes by a classifying circuit in the learning unit 144 and the predictive parameters w1 to wn are stored in the addresses defined by the classes in a predictive parameter memory 145.

The down conversion of the HD signal to the SD signal is not limited to the above method using the decimation filters but other applicable methods can be used. For example, The SD pixel a may be identified by averaging four, 2×2, pixels (e.g. A, B, C, and D) as shown in FIG. 4. Also, the SD pixel may be specified by a weighted average of more number of HD pixels (e.g. all the HD pixels in one block) rather than the simple average.

If the block comprises 3×3 SD pixels as shown in FIG. 4, a learn data is determined in the learning unit 144 from the SD pixels a to i and the four HD pixels A, B, C, and D. As a plurality of the learn data are given in a frame, a more number of the learn data can be prepared when the number of frames is increased.

Figure 12:
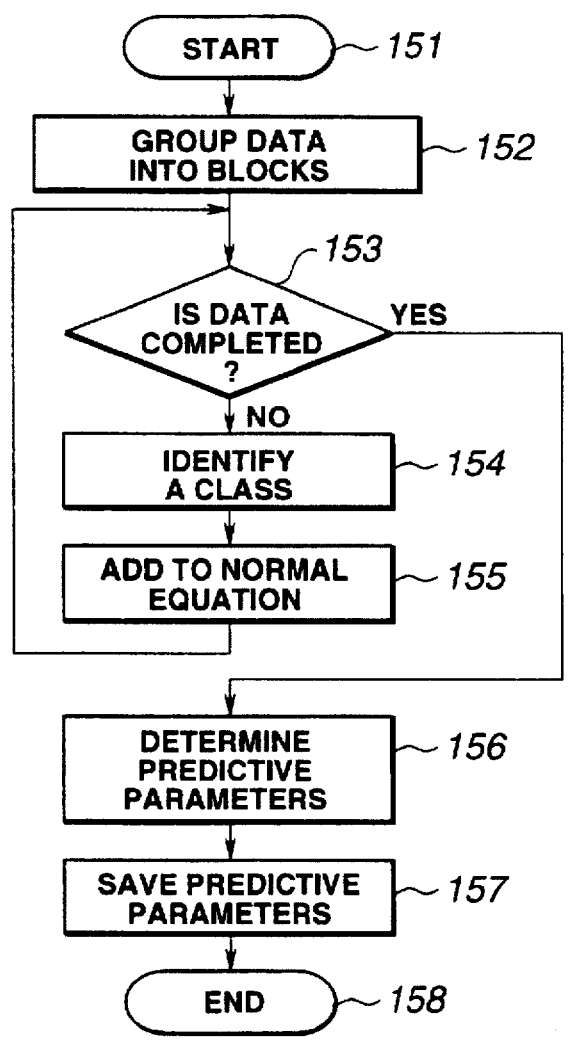
FIG. 12 is a flow chart explaining the learning process.

The learning unit 144 performs a classification in which the class is determined by compressing the SD pixels a to i to a size and examining a two-dimensional pattern of the compressed SD data size, and an arithmetic operation of calculating the predictive parameters for the class by the method of least squares. The classification is identical to the actions of the data compressing circuit 52 and the class code determining circuit 53 shown in FIG. 3. The procedure of operation of the learning unit 144 in the form of software is shown in a flow chart of FIG. 12.

As shown, the procedure in the learning unit 144 starts with Step 151 and goes to Step 152 where both the HD and SD signals are infed and grouped corresponding blocks. More specifically, the HD and SD signals are allocated to A to D and a to i respectively in a combination as shown in FIG. 4. It is then examined at Step 153 whether or not the allocation of data is complete. If yes, the procedure moves to Step 156 for determining the predictive parameters. If not, Step 154 follows for identifying the class.

At Step 154, the class is identified by a pattern of levels of the SD pixels a to i about the four HD pixels A to D to be predicted. In this step, data bits of the SD pixels are reduced in number by commonly the ADRC process. This is followed by Step 155 where normal equation summing is executed using equations (12), (13), and (14) which will be explained later.

When it is judged at Step 153 that all the data is processed, the procedure advances to Step 156 where the predictive parameters are determined through matrix solution of the (14) equation. Then, the predictive parameters are stored in the memory at Step 157. This step is followed by Step 158 for terminating the operation of the learning unit 144.

The classification in which the SD pixels a to i shown in FIG. 4 are compressed to coded forms which are then used to determine a class is identical to that of the signal converter described previously. Similarly, the predicted values for the HD pixels A to D are calculated through linear combination of the values of the SD pixels a to i and the predictive parameters w1 to wn and reference to the table shown in FIG. 9 which are described previously.

The determining the parameters for predicting the HD pixels from the SD pixels will now be explained in more details.

Assuming that the values of the SD pixels are x1 to xn and the true value of the target HD pixel is y, linear combination of n taps with the predictive parameters w1 to wn is expressed by:

$$y' = w_1 x_1 + w_2 x_2 + \ldots + w_n x_n \qquad (7)$$

Before the learning process, wi is an unknown parameter.

The learning process is applied to more than one of the HD and SD data in each class. When the number of the data is m, the (7) equation is translated to:

$$y'_j = w_1 x_1 + w_2 x_2 + \ldots + w_n x_n \qquad (8)$$

(where j=1, 2, ... m)

If m>n, wi to wn cannot be determined in this manner. Using an error vector e obtained from equation (9), the predictive parameter is calculated which minimizes the following equation (10):

$$e_j = y'_j - (w_1 x_{j1} + w_2 x_{j2} + \ldots + w_n x_{jn}) \qquad (9)$$

-continued $$E^2 = \sum_{j=0}^{m} \{e_j\}^2 \quad (10)$$

The (10) equation represents a solution of least squares. Then, a partial differential parameter of wi from the (10) equation is calculated as expressed by:

$$\frac{\partial E^2}{\partial w_i} = \sum_{j=0}^{m} 2\left(\frac{\partial e_j}{\partial w_i}\right) e_j = \sum_{j=0}^{m} 2X_{ij} \cdot e_j \quad (11)$$

The predictive parameter wi is given when the (11) equation is closed to zero. When the entries are expressed by:

$$X_{ij} = \sum_{p=0}^{m} X_{pi} \cdot X_{pj} \quad (12)$$

$$Y_i = \sum_{j=0}^{m} X_{ji} \cdot y_j \quad (13)$$

their matrix is:

$$\begin{bmatrix} X_{11} & X_{12} & \cdots & X_{1n} \\ X_{21} & X_{22} & \cdots & X_{2n} \\ \cdots & \cdots & \cdots & \cdots \\ \cdots & \cdots & \cdots & \cdots \\ X_{n1} & X_{n2} & \cdots & X_{nn} \end{bmatrix} \begin{bmatrix} w_1 \\ w_2 \\ \cdot \\ \cdot \\ w_n \end{bmatrix} = \begin{bmatrix} Y_1 \\ Y_2 \\ \cdot \\ \cdot \\ Y_n \end{bmatrix} \quad (14)$$

When the (14) matrix has been solved by a known matrix solution method such as sweep out, the predictive parameter wi is obtained. The predictive parameter is then stored in the memory using its class code as an address.

In this manner, the learning unit 144 can determine the predictive parameter wi from the true data of the HD signal. As explained previously, the predictive parameters determined by the learning unit 144 are stored in the prediction parameter memory 54 of FIG. 3.

Figure 2:
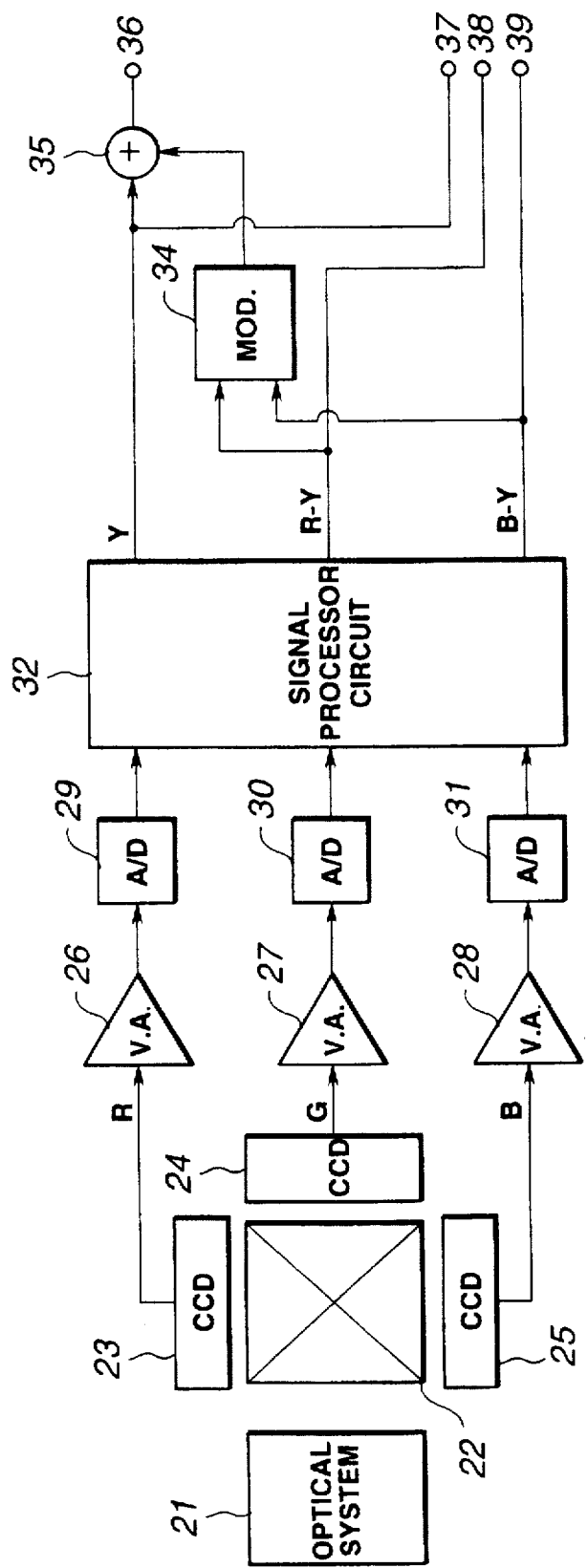
FIG. 2 is a block diagram showing another conventional imaging apparatus.

A second embodiment of the imaging apparatus of the present invention will be described referring to FIG. 13. Like components are denoted by like numerals as those in FIG. 2 and will be explained in no more details.

Figure 13:
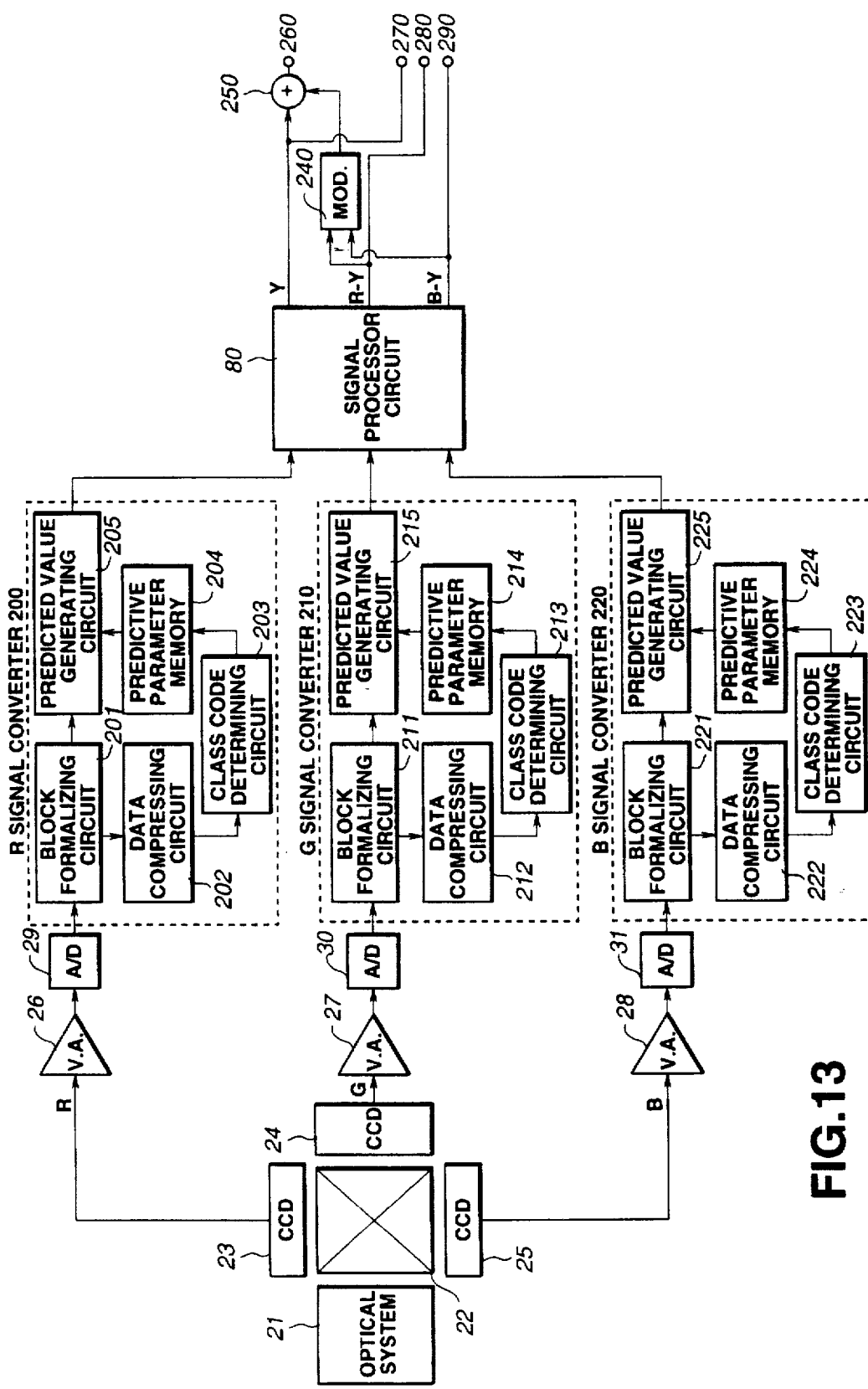
FIG. 13 is a block diagram of a second embodiment of the imaging apparatus of the present invention.

As shown in FIG. 13, light emanated from an object is introduced through an optical system 21 to a color separator prism 22. The color separator prism 22 divides the object emanated light into three, red, green, and blue, colors which are then transferred to a red CCD 23, a green CCD 24, and a blue CCD 25 respectively.

The red, green, and blue CCDs 23, 24, 25 convert their respective red, green, and blue light inputs by photoelectric processing to thee, R, G, and B signal components respectively. The R, G, and B signal components are transmitted to three video amplifiers 26, 27, and 28 respectively where they are amplified to predetermined levels before sent to three A/D converter circuits 29, 30, and 31 respectively. In their respective A/D converter circuits 29, 30, and 31, the R, G, and B signal components are converted to digital signals which are transferred to an R signal converter 200, a G signal converter 210, and a B signal converter 220 respectively.

The R signal converter 200 comprises, as shown in FIG. 13, a block formalizing circuit 201, a data compressing circuit 202, a class code determining circuit 203, a predictive parameter memory 204, and a predicted value generating circuit 205.

Similarly, the G signal converter 210 comprises, as shown in FIG. 13, a block formalizing circuit 211, a data compressing circuit 212, a class code determining circuit 213, a predictive parameter memory 214, and a predicted value generating circuit 215.

Also the B signal converter 220 comprises a block formalizing circuit 221, a data compressing circuit 222, a class code determining circuit 223, a predictive parameter memory 224, and a predicted value generating circuit 225.

The construction and operational principles of the R, G, and B signal converters 200, 210, 220 are identical to those of the R signal converter 50 shown in FIG. 3 and their description will be omitted.

Resultant high resolution R, G, and B signal outputs from their respective signal converters 200, 210, and 220 are transferred to a signal processor circuit 230. The signal processor circuit 230 performs common signal processing and matrix operations over the high resolution R, G, and B signal outputs to yield a high resolution luminance signal Y and two high resolution color-difference signals R-Y and B-Y. The high resolution R-Y and B-Y signals of the signal processor circuit 230 are then transmitted to a modulator circuit 240.

The modulator circuit 240 operates orthogonal two-axis modulation of a chrominance subcarrier with the high resolution R-Y and B-Y signals to produce a high resolution chroma signal which is then supplied to one of two inputs of an adder 250. The other input of the adder 250 receives the high resolution Y signal from the signal processor circuit 230. The high resolution chroma signal from the modulator circuit 240 and the high resolution Y signal from the processor circuit 230 are combined to a digital composite video signal of high resolution which is released from an output terminal 260. The signal processor circuit 230, modulator circuit 240, and adder 250 are tailored to operate at higher rates than those of the signal processor circuit 32, modulator circuit 34, and adder 35 of the conventional imaging apparatus shown in FIG. 2.

In addition, the high resolution Y, R-Y, and B-Y signals from the signal processor circuit 230 are directly connected to three other output terminals 270, 280, and 290 respectively for further transmission as high resolution component signals. A third embodiment of the imaging apparatus of the present invention will be described referring to FIG. 14. Like components are denoted by like numerals as those in FIG. 1 and will be explained in no more details.

Light emanated from an object is directed through a color filter 2 to a CCD 3. The color filter 2 is a complementary color filter assembly comprising, for example, a yellow filter, a cyan filter, and a magenta filter. The object emanated light is then subjected to photoelectric process in the CCD 3 before transferred as a video signal to a video amplifier 4. The video signal is amplified by the video amplifier 4 to a predetermined level and sent to an A/D converter circuit 5 where it is converted to a digital signal of a given bit format. The digital video signal from the A/D converter circuit 5 is further transmitted to a color separator circuit 6.

The color separator circuit 6 divides the digital video signal into three, R, G, and B, signal components which are then fed to a signal processor circuit 7. The signal processor circuit 7 performs common signal processing and matrix operations over the R, G, and B signal components to yield a luminance signal Y and two color-difference signals R-Y and B-Y. The R-Y and B-Y signals of the signal processor circuit 7 are then transferred to a modulator circuit 8.

The modulator circuit 8 operates orthogonal two-axis modulation of a chrominance subcarrier with the R-Y and B-Y signals to produce a chroma signal which is then supplied to one of two inputs of an adder 9. The other input of the adder 9 receives the Y signal from the signal processor circuit 7. The chroma signal from the modulator circuit 8 and the Y signal from the processor circuit 7 are summed to a digital composite video signal.

Figure 14:
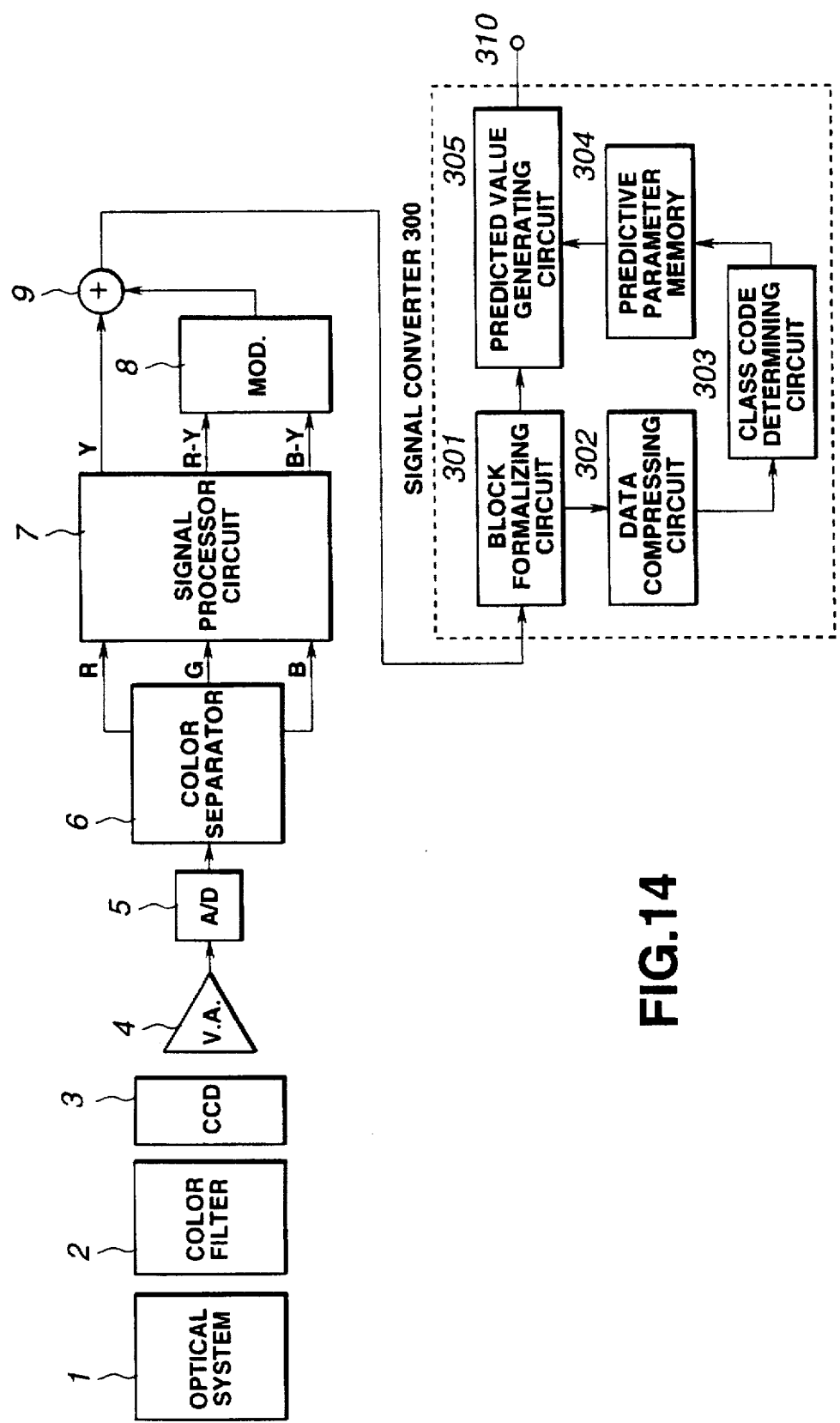
FIG. 14 is a block diagram of a third embodiment of the imaging apparatus of the present invention.

The digital composite video signal from the adder 9 is transferred to a signal converter 300 in which it is shifted to its high resolution version before released from an output terminal 310. The construction and operational principles of the signal processor 300 are identical to those of the R signal converter 50 shown in FIG. 3 and will be explained in no more details. As shown in FIG. 14, the signal processor 300 comprises a block formalizing circuit 301, a data compressing circuit 302, a class code determining circuit 303, a predictive parameter memory 304, and a predicted value generating circuit 305 which are identical to the block formalizing circuit 51, the data compressing circuit 52, the class code determining circuit 53, the predictive parameter memory 54, and the predicted value generating circuit 55 respectively in the R signal converter 50 of FIG. 3.

A fourth embodiment of the imaging apparatus of the present invention will now be described referring to FIG. 15. Like components are denoted by like numerals as those in FIG. 2 and will be explained in no more details. Light emanated from an object is introduced through an optical system 21 to a color separator prism 22. The color separator prism 22 divides the object emanated light into three, red, green, and blue, colors which are then transferred to a red CCD 23, a green CCD 24, and a blue CCD 25 respectively.

The red, green, and blue CCDs 23, 24, 25 convert their respective red, green, and blue light inputs by photoelectric processing to thee, R, G, and B signal components respectively. The R, G, and B signal components are transmitted to three video amplifiers 26, 27, and 28 respectively where they are amplified to predetermined levels before sent to three A/D converter circuits 29, 30, and 31 respectively. In their respective A/D converter circuits 29, 30, and 31, the R, G, and B signal components are converted to digital signals of a given bit format which are transferred to a signal processor circuit 32.

The signal processor circuit 32 performs common signal processing and matrix operations over the R, G, and B digital signals to yield a luminance signal Y and two color-difference signals R-Y and B-Y. The R-Y and B-Y signals of the signal processor circuit 32 are then transmitted to an R-Y signal converter 410 and a B-Y signal converter 420 respectively.

The R-Y signal converter 410 converts the R-Y signal of the signal processor circuit 32 to a high resolution R-Y signal. Similarly, the B-Y signal converter 420 converts the B-Y signal of the signal processor circuit 32 to a high resolution B-Y signal.

The Y signal from the signal processor circuit 32 is transferred to a luminance signal converter 400 where it is converted to a high resolution Y signal.

Figure 15:
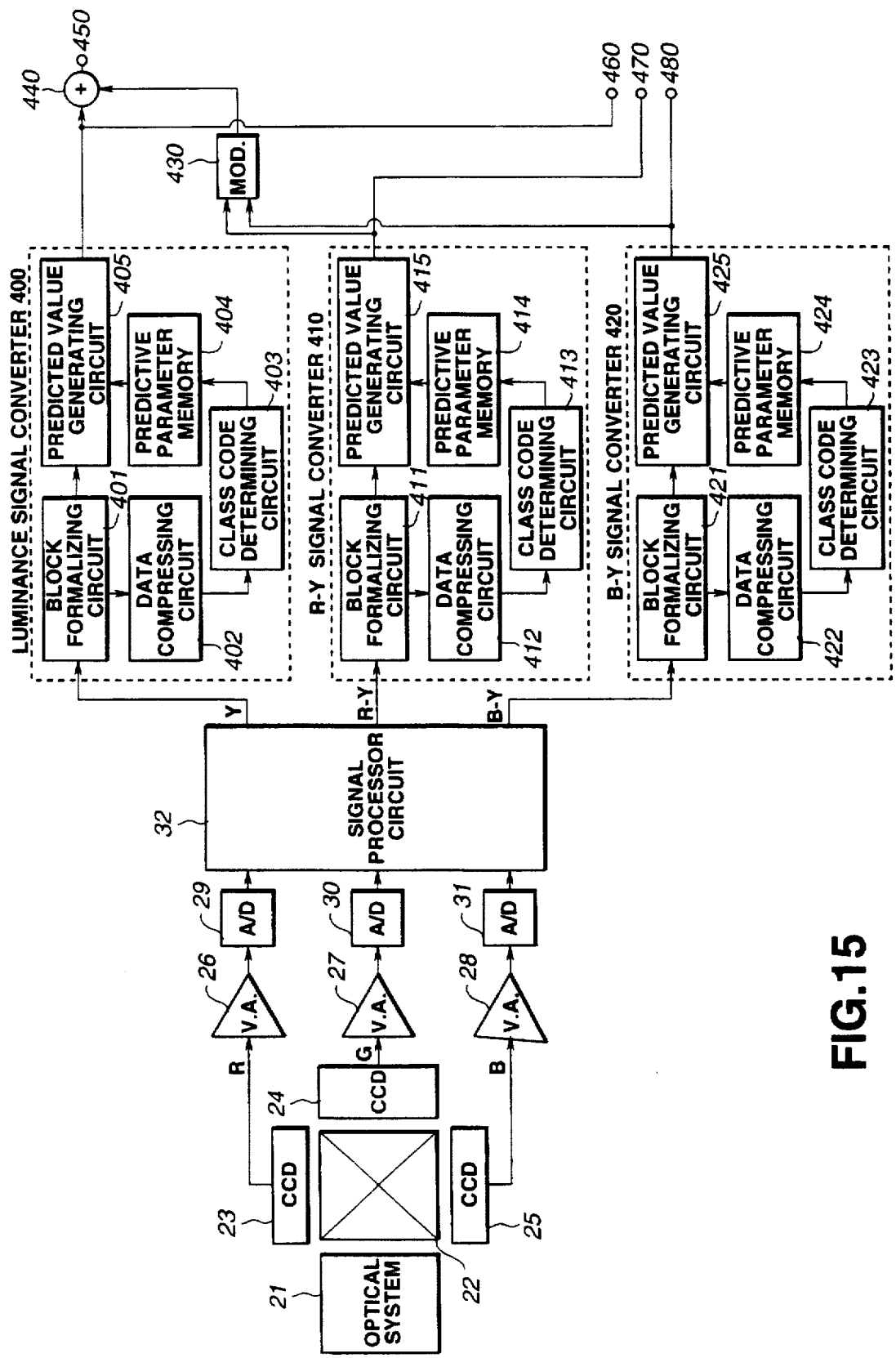
FIG. 15 is a block diagram of a fourth embodiment of the imaging apparatus of the present invention.

The luminance signal converter 400 comprises, as shown in FIG. 15, a block formalizing circuit 401, a data compressing circuit 402, a class code determining circuit 403, a predictive parameter memory 404, and a predicted value generating circuit 405.

Similarly, the R-Y signal converter 410 comprises a block formalizing circuit 411, a data compressing circuit 412, a class code determining circuit 413, a predictive parameter memory 414, and a predicted value generating circuit 415, as shown in FIG. 15.

Also the B-Y signal converter 420 comprises a block formalizing circuit 421, a data compressing circuit 422, a class code determining circuit 423, a predictive parameter memory 424, and a predicted value generating circuit 425.

The construction and operational principles of the luminance, R-Y, and B-Y signal converters 400, 410, 420 are identical to those of the R signal converter 50 shown in FIG. 3 and their description will be omitted.

Resultant high resolution R-Y and B-Y color-difference signals generated by their respective R-Y and B-Y signal converters 410 and 420 are transmitted to a modulator circuit 430. The modulator circuit 430 operates orthogonal two-axis modulation of a chrominance subcarrier with the high resolution R-Y and B-Y signals to produce a high resolution chroma signal which is then supplied to one of two inputs of an adder 440. The other input of the adder 440 receives the high resolution Y signal from the luminance signal processor circuit 400. The high resolution chroma signal from the modulator circuit 430 and the high resolution Y signal from the processor circuit 400 are combined to a digital composite video signal of high resolution which is released from an output terminal 450. The modulator circuit 430 and adder 440 are tailored to operate at higher rates than those of the modulator circuit 34 and adder 35 of the conventional imaging apparatus shown in FIG. 2.

In addition, the high resolution Y, R-Y, and B-Y signals from the luminance, R-Y, and B-Y signal converters 400, 410, 420 are directly connected to three other output terminals 460, 470, and 480 respectively for further transmission as high resolution component signals.

The imaging apparatus of the present invention are not limited to the foregoing, first to fourth, embodiments, but other modifications will be possible without departing from the scope of the present invention, including, for instance, provision of one common predictive parameter memory for conversion process of three, R, G, and B, signal components.

As set forth above, the present invention provides an improved imaging apparatus for producing high resolution video signals without increasing the number of CCD pixels.

What is claimed is:

1. An imaging apparatus comprising:

imaging means for receiving light emanated from an object through a color filter and converting it into an analog video signal;

a single analog-to-digital converter for converting the analog video signal into a digital video signal;

separating means for separating the digital video signal from the single analog-to-digital converter into an R signal component, a G signal component, and a B signal component;

first converting means for converting the R signal component from the separating means to a high resolution R signal component, second converting means for converting the G signal component from the separating means to a high resolution G signal component, and third converting means for converting the B signal component from the separating means to a high resolution B signal component, each of the high resolution R signal component, the high resolution G signal component, and the high resolution B signal component being higher in resolution than the respective original signal component; and signal processing means for receiving and processing the high resolution R signal component from the first converting means, the G signal component from the second converting means, and the B signal component from the third converting means to yield a luminance signal as well as a chrominance signal;

wherein each of the first, second, and third converting means comprises:

block formalizing means for grouping the signal component input to the converting means into blocks;

compressing means for compressing data of each block determined by the block formalizing means;

class detecting means for specifying a class of the block by examining a pattern of levels of the compressed data and producing a signal indicative of the class;

a predictive parameter memory for holding predictive parameters for use in converting the signal component input to the converting means into the high resolution signal component and for selecting the predictive parameters in response to the class indication signal from the class detecting means; and predictive operating means for subjecting the signal component input into the converting means to a predictive operation with the predictive parameters from the predictive parameter memory to produce the high resolution signal component.

2. An imaging apparatus as set forth in claim 1, further comprising combining means for producing a composite video signal from the luminance and chrominance signals of the signal processing means.

3. An imaging apparatus comprising:

first imaging means for receiving and converting red color light into an R signal second imaging means for receiving and converting green color light into a G component;

third imaging means for receiving and converting blue color light into a B signal component:

first converting means for converting the R signal component from the first to a high resolution R signal component, second converting means for converting the G signal component from the second imaging means to a high resolution G signal component, and third converting means for converting the B signal component from the third imaging means to a high resolution B signal component each of the high resolution R signal component, the high resolution G signal component, and the high resolution B signal component being higher in resolution than the respective original signal component; and signal processing means for receiving and processing the high resolution R signal component from the first converting means, the high resolution G signal component from the second converting means, and the high resolution B signal component from the third converting means to yield a luminance signal as well as a chrominance signal, wherein each of the first, second, and third converting means comprises:

block formalizing means for grouping the signal component input to the converting means into blocks;

compressing means for compressing data of each block determined by the block formalizing means;

class detecting means for specifying a class of the block by examining a pattern of levels of the compressed data and producing a signal indicative of the class;

a predictive parameter memory for holding predictive parameters for use in converting the signal component input to the converting means to the high resolution signal component and for selecting the predictive parameters in response to the class indication signal from the class detecting means; and predictive operating means for subjecting the signal component input into the converting means to a predictive operation with the predictive parameters from the predictive parameter memory to produce the high resolution signal component.

4. An imaging apparatus as set forth in claim 3, further comprising combining means for producing a composite video signal from the luminance and chrominance signals from the signal processing means.

* * * * *